(12) United States Patent
Xu et al.

(10) Patent No.: US 11,283,977 B2
(45) Date of Patent: Mar. 22, 2022

(54) CAMERA MODULE AND MOBILE TERMINAL

(71) Applicant: KUNSHAN Q TECHNOLOGY COMPANY LIMITED, Suzhou (CN)

(72) Inventors: Yangliu Xu, Suzhou (CN); Aiguo Deng, Suzhou (CN); Huanhuan Yan, Suzhou (CN); Yuanbin Jin, Suzhou (CN)

(73) Assignee: KUNSHAN Q TECHNOLOGY COMPANY LIMITED, Suzhou (CN)

( * ) Notice: Subject to any disclaimer, the term of this patent is extended or adjusted under 35 U.S.C. 154(b) by 0 days.

(21) Appl. No.: 16/973,411

(22) PCT Filed: Apr. 17, 2019

(86) PCT No.: PCT/CN2019/083123
§ 371 (c)(1),
(2) Date: Dec. 8, 2020

(87) PCT Pub. No.: WO2019/233194
PCT Pub. Date: Dec. 12, 2019

(65) Prior Publication Data
US 2021/0243342 A1 Aug. 5, 2021

(30) Foreign Application Priority Data

Jun. 8, 2018 (CN) .......................... 201810590243.3

(51) Int. Cl.
*H04N 5/225* (2006.01)
*G03B 11/00* (2021.01)
(Continued)

(52) U.S. Cl.
CPC ........... *H04N 5/2254* (2013.01); *G03B 11/00* (2013.01); *G03B 17/12* (2013.01); *H04M 1/0264* (2013.01); *H04M 2250/52* (2013.01)

(58) Field of Classification Search
CPC .. H04N 5/2253; H04N 5/2254; H04N 5/2257; H04N 5/2258; H04M 1/0264
(Continued)

(56) References Cited

U.S. PATENT DOCUMENTS

2005/0012032 A1* 1/2005 Onodera ................ H01L 27/146
250/214.1
2016/0044213 A1* 2/2016 Jao ........................ H04N 5/2257
348/374

(Continued)

FOREIGN PATENT DOCUMENTS

CN 106027863 A 10/2016
CN 206481363 U * 9/2017 ........... H04N 5/2254
(Continued)

*Primary Examiner* — Anthony J Daniels
(74) *Attorney, Agent, or Firm* — Cheng-Ju Chiang

(57) ABSTRACT

A camera module includes a support base, an optical filter and a lens assembly. The lens assembly is installed on the support base. The support base includes a plastic platform and a metal frame. The metal frame is bonded to the plastic platform. The optical filter is sandwiched between the plastic platform and the metal frame. The present invention further involves a mobile terminal. The support base is formed by bonding the plastic platform to the metal frame and bonding the optical filter between the plastic platform and the metal frame. The metal frame embedded in the plastic platform can greatly increase the strength of the support base, and besides, the optical filter is fixedly sandwiched between the plastic platform and the metal frame without needing to further fix the optical filter by using adhesives, preventing the optical filter from becoming dirty in the process of fixing.

20 Claims, 12 Drawing Sheets

(51) Int. Cl.
    *G03B 17/12*     (2021.01)
    *H04M 1/02*     (2006.01)

(58) Field of Classification Search
    USPC .......................................................... 348/374
    See application file for complete search history.

(56) References Cited

U.S. PATENT DOCUMENTS

| | | |
|---|---|---|
| 2017/0310861 A1 | 10/2017 | Wang et al. |
| 2021/0028210 A1* | 1/2021 | Okamoto ................ G03B 17/02 |
| 2021/0127042 A1* | 4/2021 | Song ................... H04M 1/0264 |

FOREIGN PATENT DOCUMENTS

| | | | | |
|---|---|---|---|---|
| CN | 206481363 U | | 9/2017 | |
| CN | 107343126 A | * | 11/2017 | ........... H04N 5/2254 |
| CN | 107422444 A | | 12/2017 | |
| CN | 206712912 U | | 12/2017 | |
| CN | 207070179 U | | 3/2018 | |
| CN | 108632514 A | | 10/2018 | |
| CN | 208509052 U | | 2/2019 | |
| KR | 10-2010-0051013 A | | 5/2010 | |
| KR | 10-2013-0055288 A | | 5/2013 | |
| KR | 10-2014-0076819 A | | 6/2014 | |

* cited by examiner

CAMERA MODULE AND MOBILE TERMINAL

CROSS REFERENCE TO RELATED APPLICATIONS

This application is a 35 U.S.C. § 371 National Phase conversion of International (PCT) Patent Application No. PCT/CN2019/083123, filed on Apr. 17, 2019, which claims the priority of Chinese Patent Application No. 201810590243.3, filed on Jun. 8, 2018. The contents of the above-identified applications are incorporated herein by reference. The PCT International Patent Application was filed and published in Chinese.

TECHNICAL FIELD

The present invention relates to the technical field of camera imaging, and in particular, to a camera module and a mobile terminal.

BACKGROUND OF THE INVENTION

A camera module generally includes a circuit board, a photosensitive chip, a support base, a lens assembly and an optical filter. The photosensitive chip is arranged on the circuit board, the support base is fixed on the circuit board, the lens assembly is installed on the support base, and the optical filter is arranged on the support base and positioned between the photosensitive chip and the lens assembly. At present, the optical filter is adhered to the support base made of plastic material through adhesives or the like. On one hand, the support base made of plastic material has low structural strength and is easy to lose its supporting function; on the other hand, the optical filter is easy to be dirtied in the adhesion process, so that the imaging effect is affected.

SUMMARY OF THE INVENTION

In view of the above, the present invention provides a camera module and a mobile terminal which are high in strength and helpful for keeping an optical filter clean.

A camera module includes a support base, an optical filter and a lens assembly. The lens assembly is installed on the support base. The support base includes a plastic platform and a metal frame. The metal frame is bonded to the plastic platform. The optical filter is sandwiched between the plastic platform and the metal frame.

In one embodiment of the present invention, the plastic platform, the metal frame and the optical filter are bonded together through an insert molding process.

In one embodiment of the present invention, an inner sidewall of the plastic platform is provided with fixing plates, and an outer periphery of the optical filter is sandwiched between the fixing plates and the metal frame.

In one embodiment of the present invention, a plurality of support plates are provided below the plastic platform, and the support plates are disposed at the peripheral edge position of the plastic platform.

In one embodiment of the present invention, at least one of the support plates is a metal plate extending integrally from the metal frame, and the remaining support plates are plastic plates extending integrally from the plastic platform.

In one embodiment of the present invention, a thickness of the metal plate is smaller than that of the plastic plate.

In one embodiment of the present invention, the support plates include a first support plate, a second support plate, a third support plate and a fourth support plate. The first support plate and the second support plate are oppositely arranged. The third support plate and the fourth support plate are oppositely arranged. The first support plate, the second support plate, the third support plate and the fourth support plate are connected end to end to form a frame structure.

In one embodiment of the present invention, the first support plate is a metal plate, two ends of the first support plate are individually formed with an extension plate facing outwards, a rear end of the extension plate is formed with a hook portion perpendicular to the extension plate, and the extension plates and the hook portions are all embedded into the plastic platform.

In one embodiment of the present invention, the metal frame includes a plurality of flat plates, the flat plates are connected end to end, at least one flat plate is provided with a plurality of wings, and the wings are all embedded into the plastic platform.

In one embodiment of the present invention, the metal frame further includes a connecting plate, the connecting plate is connected to the flat plate through at least two wings, and there is a gap provided between the connecting plate and the flat plate.

In one embodiment of the present invention, the camera module further includes a circuit board and a photosensitive chip. The photosensitive chip is arranged on the circuit board, the plastic platform is fixed on the circuit board via the support plates, and the optical filter is positioned between the photosensitive chip and the lens assembly.

In one embodiment of the present invention, a carrying portion is provided above the plastic platform for carrying the lens assembly, the carrying portion is provided with an inner thread on an inner sidewall thereof, the lens assembly is provided with an outer thread on an outer sidewall thereof, and the lens assembly is installed on the carrying portion through the inner thread engaged with the outer thread.

In one embodiment of the present invention, the lens assembly includes a lens and a voice coil motor. The lens is fixedly installed on a mounting seat of the voice coil motor, one end of a lower spring of the voice coil motor is connected to the mounting seat, the other end of the lower spring of the voice coil motor is connected to the plastic platform, and the lens is driven to move up and down by the voice coil motor.

In one embodiment of the present invention, the lens assembly is directly installed to an upper surface of the plastic platform.

The present invention further provides a camera module as described above, and the camera module serves as a front camera of the mobile terminal.

In the camera module and the mobile terminal of the embodiments of the present invention, the support base is formed by bonding the plastic platform and the metal frame, and the optical filter is sandwiched between the plastic platform and the metal frame. On one hand, the metal frame embedded in the plastic platform can greatly increase the strength of the support base to form a better support; on the other hand, since the optical filter is sandwiched and fixed between the plastic platform and the metal frame, the optical filter does not need to be additionally fixed through adhesives or the like, so that the optical filter is prevented from being dirtied in the fixing process.

DETAILED DESCRIPTION OF PREFERRED EMBODIMENTS

In order to make the purposes, aspects, and advantages of the present invention much clear, embodiments of the invention will be described further below in conjunction with the accompanying drawings.

First Embodiment

Figure 1:
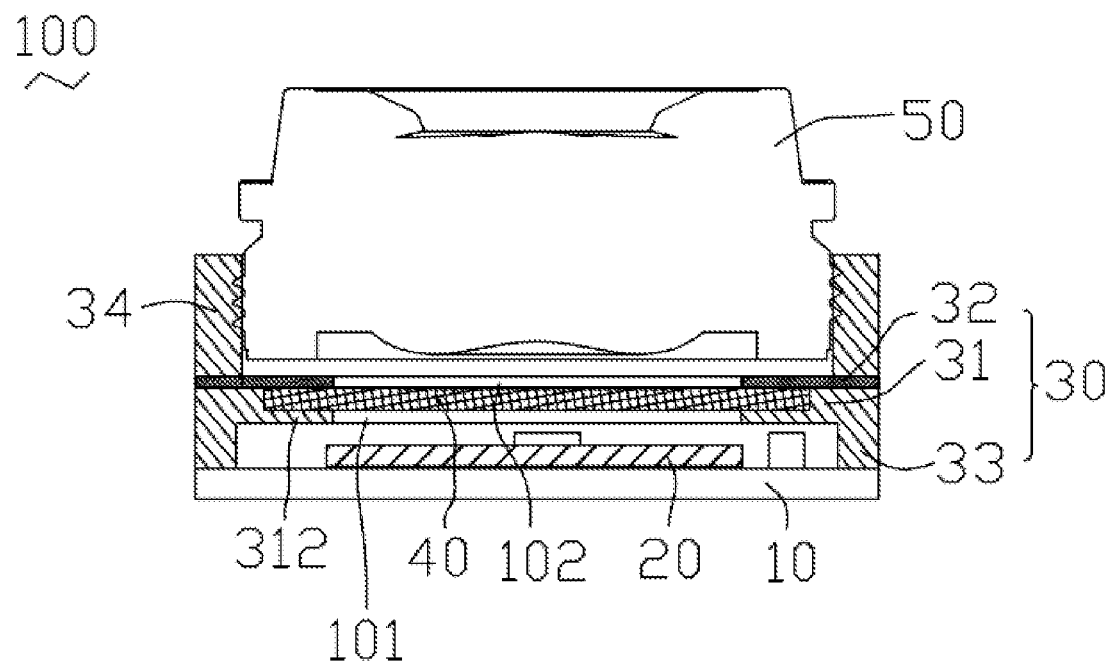
FIG. 1 is a schematic cross-sectional view of a camera module according to a first embodiment of the present invention.
Figure 2:
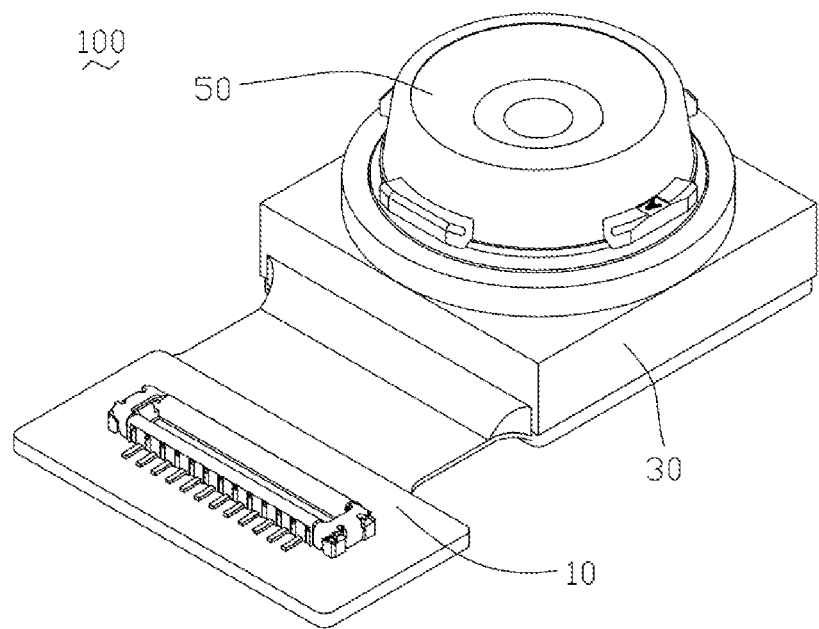
FIG. 2 is a perspective view of the camera module of FIG. 1.

As shown in FIGS. 1-2, in this embodiment, a camera module 100 includes a circuit board 10, a photosensitive chip 20, a support base 30, an optical filter 40, and a lens assembly 50. The photosensitive chip 20 is arranged on the circuit board 10 and is positioned within the support base 30. The support base 30 is fixed on the circuit board 10. The optical filter 40 and the lens assembly 50 are installed on the support base 30, and the optical filter 40 is positioned between the photosensitive chip 20 and the lens assembly 50.

The support base 30 includes a plastic platform 31 and a metal frame 32. The metal frame 32 is bonded to the plastic platform 31. The optical filter 40 is sandwiched between the plastic platform 31 and the metal frame 32. The plastic platform 31, the metal frame 32 and the optical filter 40 can be bonded together through insert molding. That is, when forming the plastic platform 31, the metal frame 32 and the optical filter 40 are placed in a mold, then molten plastic material is injected into the cavity of the mold to cover the periphery of the metal frame 32 and the optical filter 40 with the molten plastic material and form the plastic platform 31 after cooling, so that the metal frame 32 and the optical filter 40 are embedded in the plastic platform 31. However, the manner in which the metal frame 32 and the optical filter 40 are bonded to the plastic platform 31 is not limited, for example, the metal frame 32 can be bonded to the plastic platform 31 through adhesives, locking, screws or interference fit, while the optical filter 40 is sandwiched between the plastic platform 31 and the metal frame 32.

Figure 3:
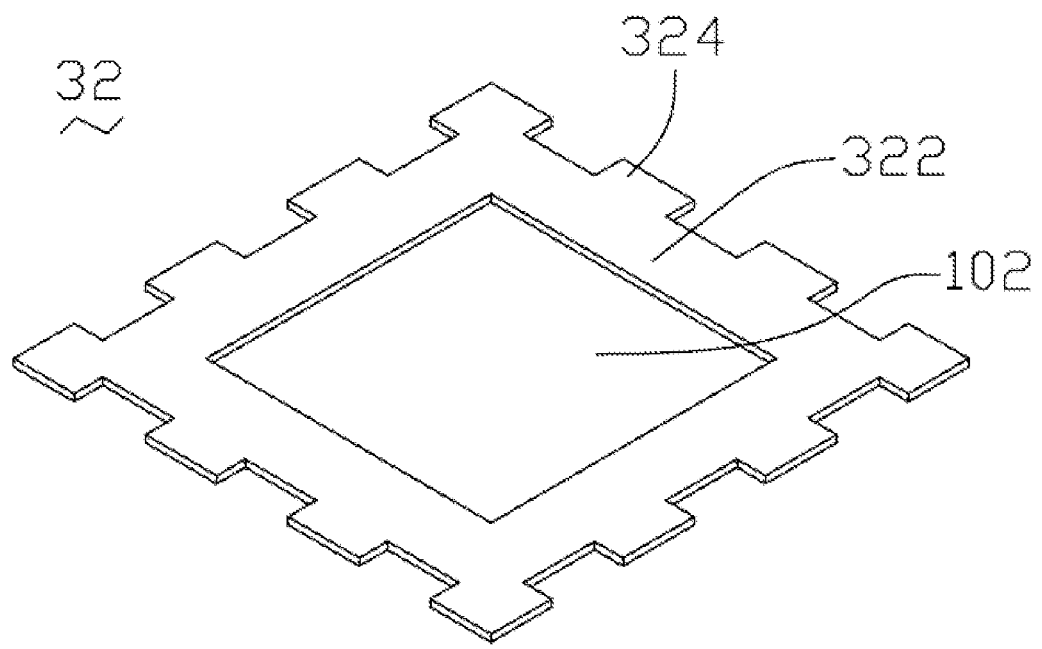
FIG. 3 is a schematic view of a metal frame of the camera module of FIG. 1.
Figure 4:
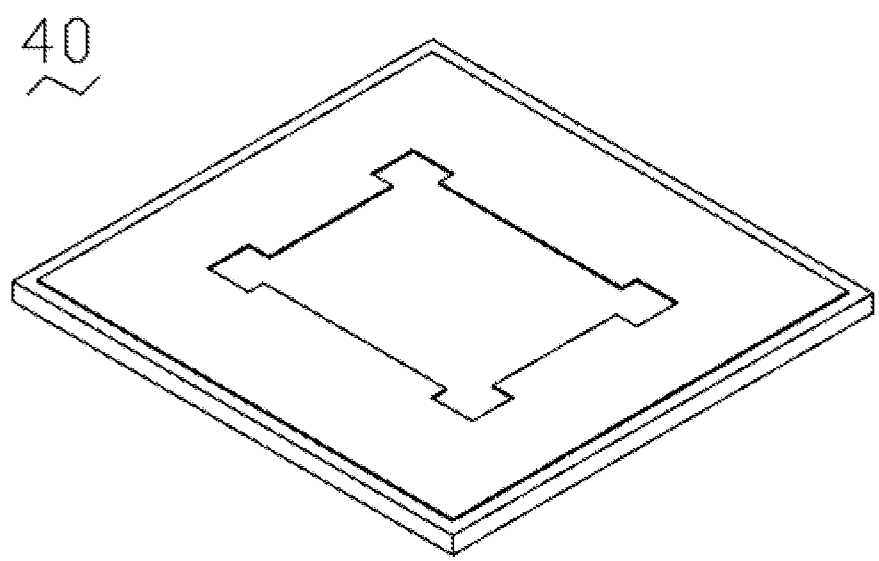
FIG. 4 is a schematic view of an optical filter of the camera module of FIG. 1.
Figure 5:
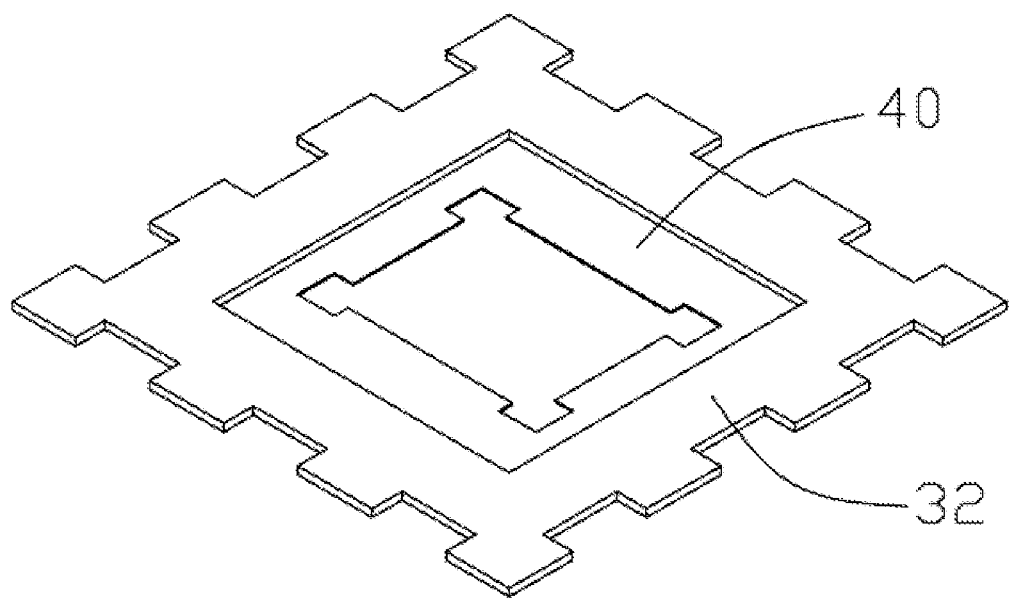
FIG. 5 is a schematic view showing that the optical filter of the camera module of FIG. 1 is attached to the metal frame.
Figure 6:
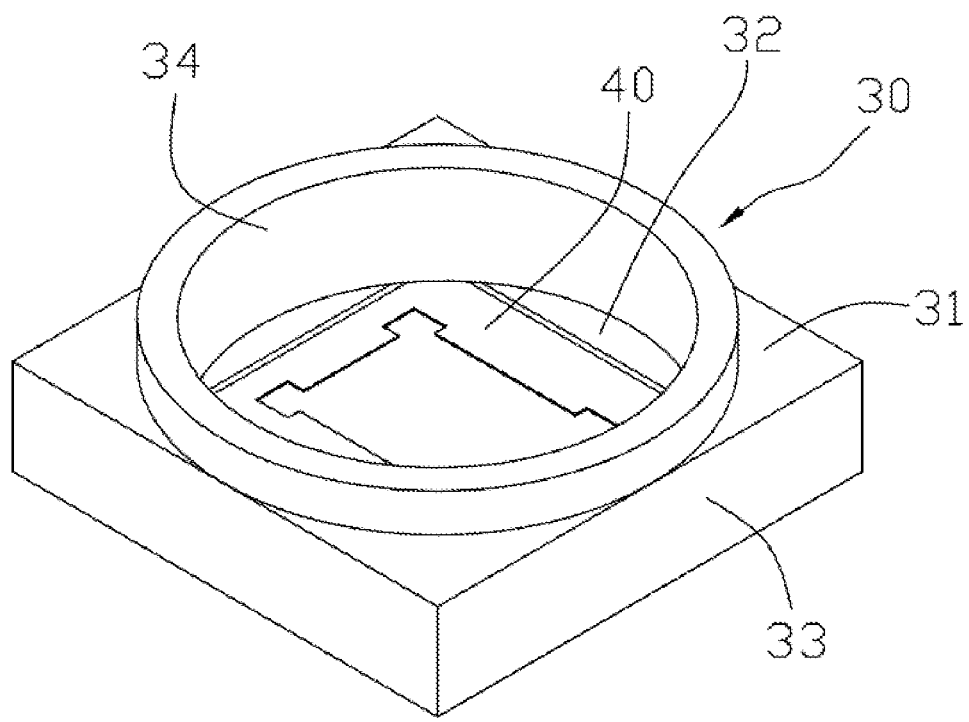
FIG. 6 is a schematic view showing that the optical filter of the camera module of FIG. 1 is bonded to the support base.

Specifically, when the plastic platform 31, the metal frame 32 and the optical filter 40 are bonded together by an insert molding process, as shown in FIGS. 3-4, the metal frame 32 and the optical filter 40 are first provided; as shown in FIG. 5, the optical filter 40 is then attached to one side of the metal frame 32, e.g., the optical filter 40 is attached to the lower side of the metal frame 32; as shown in FIG. 6, the plastic platform 31 is then injection molded by an insert molding process to bond the plastic platform 31, the metal frame 32 and the optical filter 40 together, and the optical filter 40 is sandwiched between the metal frame 32 and the plastic platform 31. Because the optical filter 40 is sandwiched and fixed between the metal frame 32 and the plastic platform 31 through insert molding process, and the optical filter 40 is embedded into the plastic platform 31, a smaller width is needed to be supported on the plastic platform 31, which is helpful for reducing the size of the camera module in the horizontal direction.

The middle of the plastic platform 31 is provided with a first through hole 101 for light to pass through, and the first through hole 101 penetrates through the plastic platform 31. The optical filter 40 is disposed in the first through hole 101 of the plastic platform 31, and the photosensitive chip 20 is arranged corresponding to the first through hole 101.

In this embodiment, the inner sidewall of the plastic platform 31 is provided with fixing plates 312 for supporting the optical filter 40. The fixing plates 312 are formed by extending horizontally inwardly from the inner sidewall of the plastic platform 31 along a radial direction thereof, and the outer periphery of the optical filter 40 is sandwiched between the fixing plates 312 and the metal frame 32. Specifically, in this embodiment, the plastic platform 31 is disposed below the optical filter 40 and the metal frame 32 is disposed above the optical filter 40. It can be understood that the plastic platform 31 may be disposed above the optical filter 40 and the metal frame 32 may be disposed below the optical filter 40.

In this embodiment, a carrying portion 34 for carrying the lens assembly 50 is provided above the plastic platform 31. The carrying portion 34 has a cylindrical structure and is formed by extending upwardly and perpendicularly to the plastic platform 31. Internal threads are provided on the inner sidewall of the carrying portion 34, external threads are provided on the outer sidewall of the lens assembly 50, and the internal threads are engaged with the external threads, so that the lens assembly 50 is installed on the carrying portion 34. In this embodiment, the camera module is a fixed-focus camera affixed through threads.

As shown in FIG. 3, the metal frame 32 includes a plurality of flat plates 322. The flat plates 322 are connected end to end to surround a second through hole 102 formed corresponding to the first through hole 101. In this embodiment, the metal frame 32 includes four flat plates 322 which are connected to surround and form a rectangle. A portion of each flat plate 322 is exposed outside the plastic platform 31, and the other portion of each flat plate 322 is embedded into the plastic platform 31 through the insert molding process, so that the metal frame 32 and the plastic platform 31 are bonded together. It can be understood that each flat plate 322 may also be wholly embedded into the plastic platform 31, to thereby provide a greater bonding strength between the plastic platform 31 and the metal frame 32. In one embodiment, the metal frame 32 is formed of aluminum or iron by cutting or stamping, while the particular material of the metal frame 32 can be freely selected as desired.

Specifically, at least one flat plate 322 is provided with a plurality of wings 324. In this embodiment, the wings 324 are spaced apart from each other, and each flat plate 322 is provided with the wings 324. The wings 324 are all embedded into the plastic platform 31 during the insert molding process, so that the bonding strength of the metal frame 32 and the plastic platform 31 can be increased due to the presence of the wings 324. In one embodiment, the optical filter 40 is installed on the flat plate 322 and covers the second through hole 102.

A plurality of support plates 33 are provided below the plastic platform 31. The support plates 33 are connected with the plastic platform 31 and disposed at the peripheral edge position of the plastic platform 31. The support plates 33 are used for fixing the plastic platform 31 on the circuit board 10. Specifically, each supporting plate 33 has a plate-shaped structure formed by extending downwardly and perpendicularly to the plastic platform 31. The number of the supporting plates 33 may be four, and the four support plates 33 are connected to surround and form a rectangle. In this embodiment, the support plates 33 are all plastic plates formed by extending integrally from the plastic platform 31. In other embodiments, one or more support plates 33 may also be provided as metal plates, while the remaining support plates 33 are plastic plates, wherein each metal plate is formed by extending integrally from the flat plate 322 of the metal frame 32 and each plastic plate is formed by extending integrally from the plastic platform 31. Specifically, the metal plate may be formed by bending 90° from a side edge of the flat plate 322, and the plastic plate may be integrally formed with the plastic platform 31 by injection molding.

In the camera module 100 of this embodiment, the support base 30 is formed by bonding the plastic platform 31 and the metal frame 32, and the optical filter 40 is sandwiched between the plastic platform 31 and the metal frame 32. On one hand, the metal frame 32 embedded in the plastic platform 31 can greatly increase the strength of the support base 30 to form a better support; on the other hand, since the optical filter 40 is sandwiched and fixed between the plastic platform 31 and the metal frame 32, the optical filter 40 does not need to be additionally fixed through adhesives or the like, so that the optical filter 40 is prevented from being dirtied in the fixing process. Moreover, in this embodiment, the optical filter 40 is sandwiched between the metal frame 32 and the plastic platform 31 through the insert molding process, and the optical filter 40 is embedded into the plastic platform 31, so that only a small width is needed to be supported on the plastic platform 31, which is helpful for reducing the size of the camera module in the horizontal direction.

Second Embodiment

Figure 7:
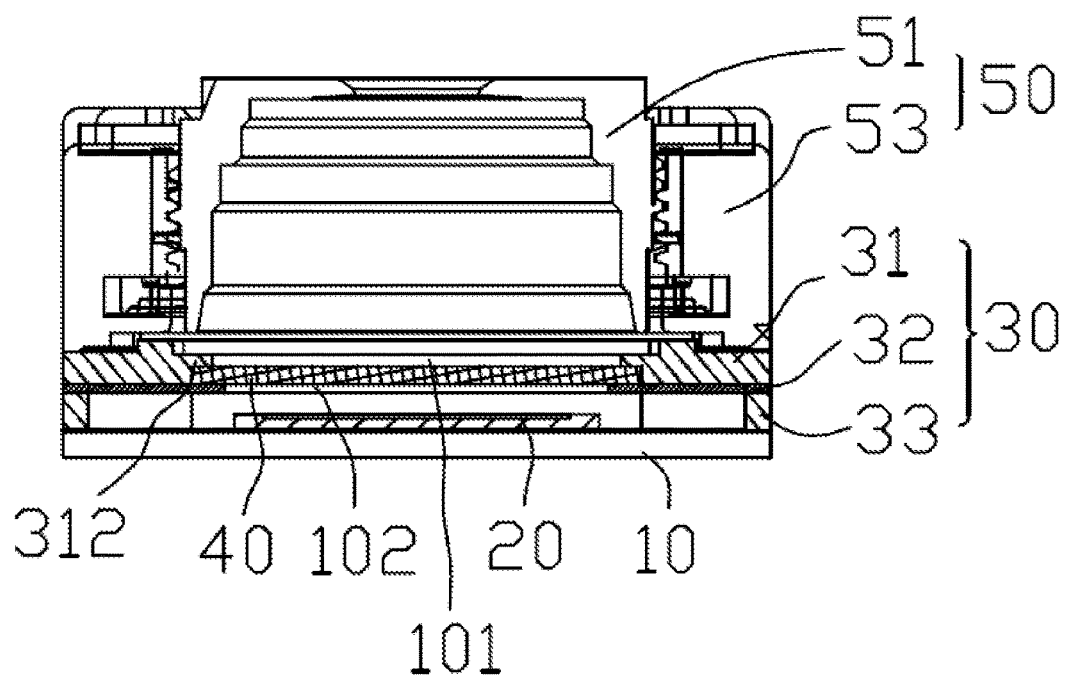
FIG. 7 is a schematic cross-sectional view of a camera module according to a second embodiment of the present invention.
Figure 8:
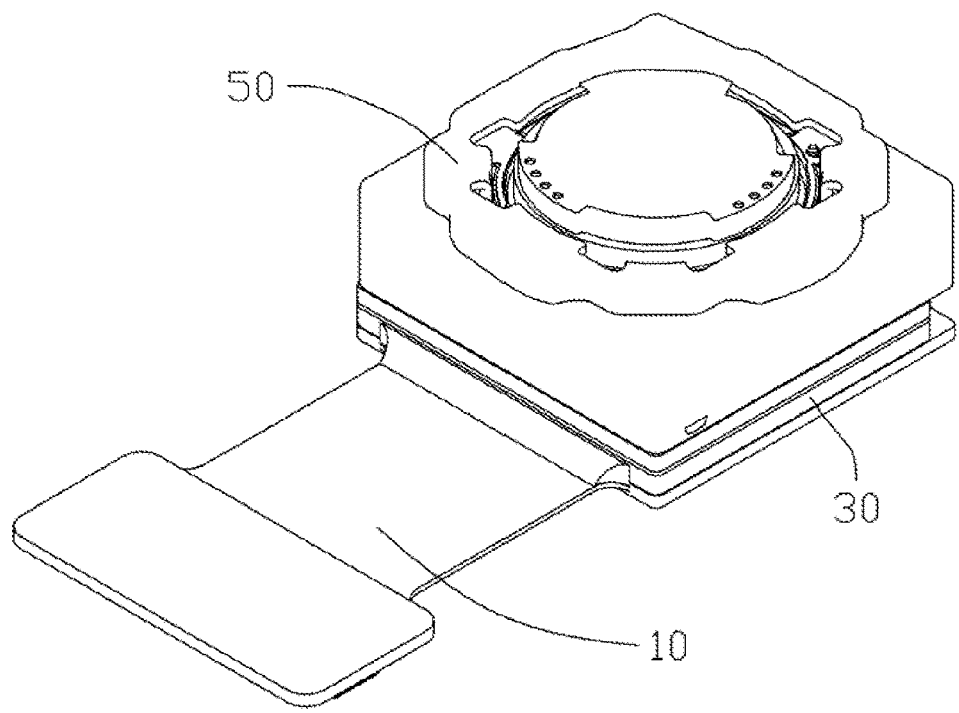
FIG. 8 is a perspective view of the camera module of FIG. 7.

As shown in FIGS. 7-8, in this embodiment, a camera module 100 includes a circuit board 10, a photosensitive chip 20, a support base 30, an optical filter 40, and a lens assembly 50. The photosensitive chip 20 is arranged on the circuit board 10 and is positioned within the support base 30. The support base 30 is fixed on the circuit board 10. The optical filter 40 and the lens assembly 50 are installed on the support base 30, and the optical filter 40 is positioned between the photosensitive chip 20 and the lens assembly 50.

The support base 30 includes a plastic platform 31 and a metal frame 32. The metal frame 32 is bonded to the plastic platform 31. The optical filter 40 is sandwiched between the plastic platform 31 and the metal frame 32. The plastic platform 31, the metal frame 32 and the optical filter 40 can be bonded together through insert molding, but are not limited thereto. For example, the metal frame 32 can also be bonded to the plastic platform 31 through adhesives, locking, screws or interference fit, while the optical filter 40 is sandwiched between the plastic platform 31 and the metal frame 32.

Figure 9:
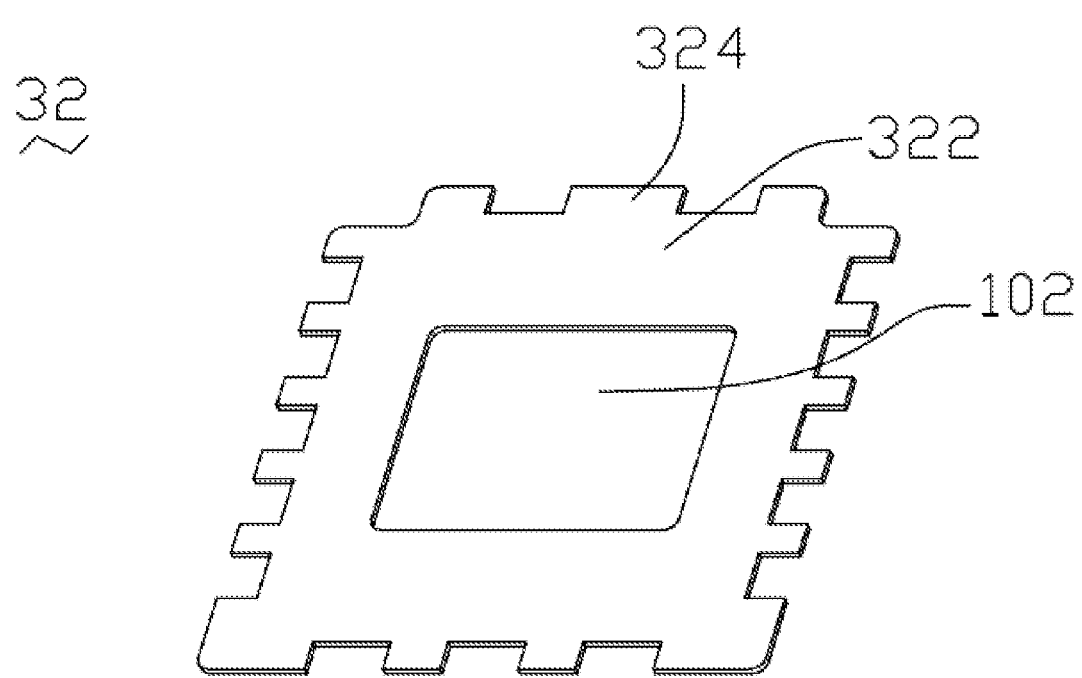
FIG. 9 is a schematic view of a metal frame of the camera module of FIG. 7.
Figure 10:
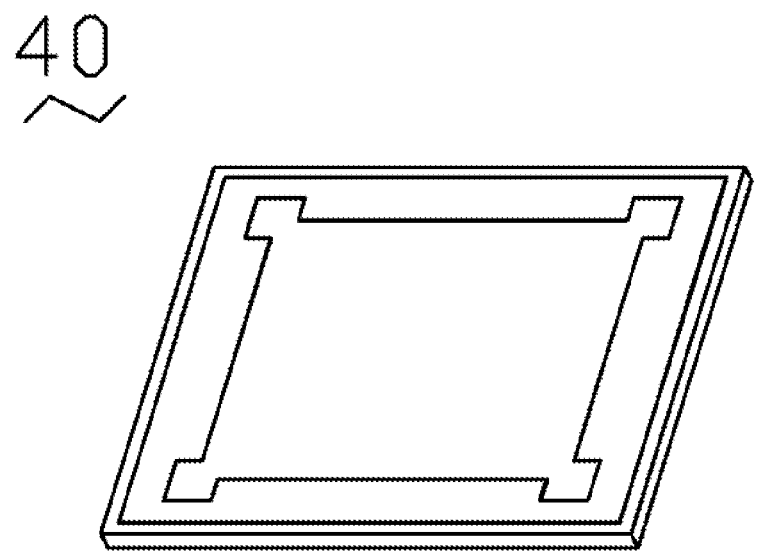
FIG. 10 is a schematic view of an optical filter of the camera module of FIG. 7.
Figure 11:
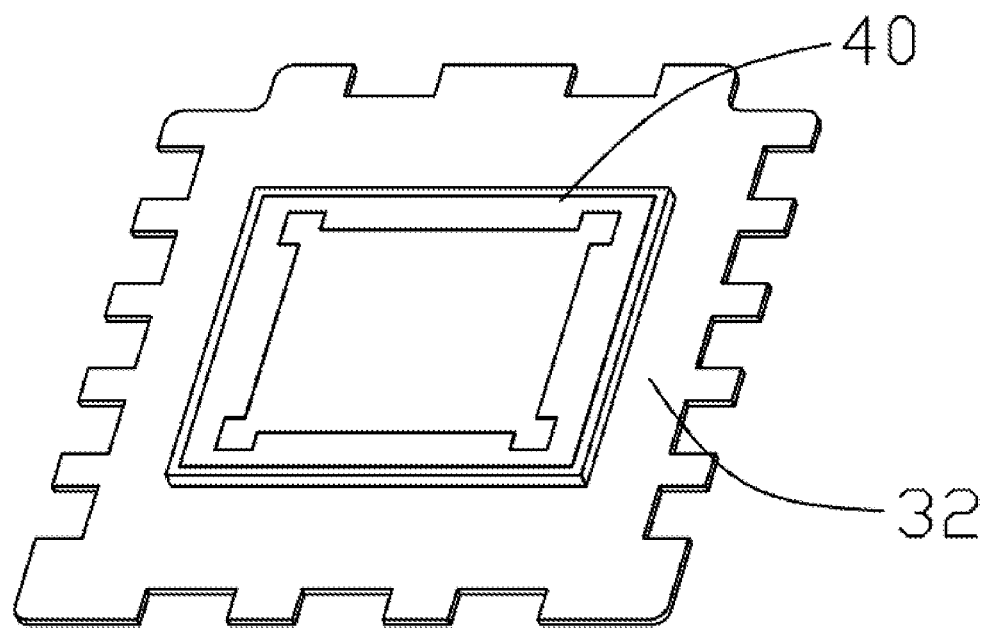
FIG. 11 is a schematic view showing that the optical filter of the camera module of FIG. 7 is attached to the metal frame.
Figure 12:
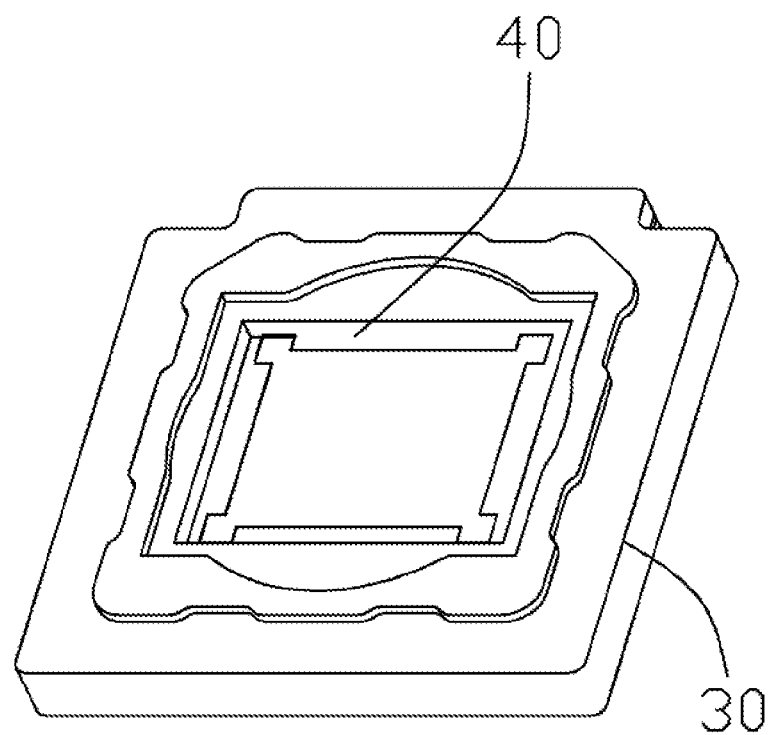
FIG. 12 is a schematic view showing that the optical filter of the camera module of FIG. 7 is bonded to the support base.

Specifically, when the plastic platform 31, the metal frame 32, and the optical filter 40 are bonded together by an insert molding process, as shown in FIGS. 9-10, the metal frame 32 and the optical filter 40 are first provided; as shown in FIG. 11, the optical filter 40 is then attached to one side of the metal frame 32, e.g., the optical filter 40 is attached to the upper side of the metal frame 32; as shown in FIG. 12, the plastic platform 31 is then injection molded by an insert molding process to bond the plastic platform 31, the metal frame 32 and the optical filter 40 together, and the optical filter 40 is sandwiched between the metal frame 32 and the plastic platform 31. Because the optical filter 40 is sandwiched and fixed between the metal frame 32 and the plastic platform 31 through insert molding process, and the optical filter 40 is embedded into the plastic platform 31, a smaller width is needed to be supported on the plastic platform 31, which is helpful for reducing the size of the camera module in the horizontal direction.

The middle of the plastic platform 31 is provided with a first through hole 101 for light to pass through, and the first through hole 101 penetrates through the plastic platform 31. The optical filter 40 is disposed in the first through hole 101 of the plastic platform 31, and the photosensitive chip 20 is arranged corresponding to the first through hole 101.

In this embodiment, the inner sidewall of the plastic platform 31 is provided with fixing plates 312 for supporting the optical filter 40, and the outer periphery of the optical filter 40 is sandwiched between the fixing plates 312 and the metal frame 32. In this embodiment, the plastic platform 31 is disposed above the optical filter 40 and the metal frame 32 is disposed below the optical filter 40. It can be understood that the plastic platform 31 may be disposed below the optical filter 40 and the metal frame 32 may be disposed above the optical filter 40.

As shown in FIG. 9, the metal frame 32 includes a plurality of flat plates 322. The flat plate 322 are connected end to end to surround a second through hole 102 formed corresponding to the first through hole 101. In this embodiment, the metal frame 32 includes four flat plates 322 which are connected to surround and form a rectangle. A portion of each flat plate 322 is exposed outside the plastic platform 31, and the other portion of each flat plate 322 is embedded into the plastic platform 31 through the insert molding process, so that the metal frame 32 and the plastic platform 31 are bonded together. It can be understood that each flat plate 322 may also be wholly embedded in the plastic platform 31, to thereby provide a greater bonding strength between the plastic platform 31 and the metal frame 32. In one embodiment, the metal frame 32 is formed of aluminum or iron by cutting or stamping, while the particular material of the metal frame 32 can be freely selected as desired.

Specifically, at least one flat plate 322 is provided with a plurality of wings 324. In this embodiment, the wings 324 are spaced apart from each other and each flat plate 322 is provided with the wings 324. The wings 324 are embedded into the plastic platform 31 during the insert molding process, so that the bonding strength of the metal frame 32 and the plastic platform 31 can be increased due to the presence of the wings 324. In this embodiment, the wings 324 on two opposing plates 322 are larger in size than the wings 324 on the other two opposing plates 322. In one embodiment, the optical filter 40 is installed on the flat plate 322 and covers the second through hole 102.

A plurality of support plates 33 are arranged below the plastic platform 31. The support plates 33 are connected with the plastic platform 31 and disposed at the peripheral edge position of the plastic platform 31. The support plates 33 are used for fixing the plastic platform 31 on the circuit board 10. Specifically, the number of the support plates 33 may be four, and the four support plates 33 are connected to surround and form a rectangle. In this embodiment, the support plates 33 are all plastic plates formed by extending integrally from the plastic platform 31. In other embodiments, one or more support plates 33 may also be provided as metal plates, while the remaining support plates 33 are plastic plates, wherein each metal plate is formed by extending integrally from the flat plate 322 of the metal frame 32 and each plastic plate is formed by extending integrally from the plastic platform 31. Specifically, the metal plate may be formed by bending 90° from a side edge of the flat plate 322, and the plastic plate may be integrally formed with the plastic platform 31 by injection molding.

In this embodiment, the lens assembly 50 includes a lens 51 and a voice coil motor 53. The lens 51 is fixedly installed on a mounting seat of the voice coil motor 53, one end of a lower spring of the voice coil motor 53 is connected to the mounting seat, the other end of the lower spring is connected to the plastic platform 31, and the lens 51 can be driven to move up and down by the voice coil motor 53 so as to realize focusing. In this embodiment, the camera module is a zoom camera.

In the camera module 100 of this embodiment, the support base 30 is formed by bonding the plastic platform 31 and the metal frame 32, and the optical filter 40 is sandwiched between the plastic platform 31 and the metal frame 32. On one hand, the metal frame 32 embedded in the plastic platform 31 can greatly increase the strength of the support base 30 to form a better support; on the other hand, since the optical filter 40 is sandwiched and fixed between the plastic platform 31 and the metal frame 32, the optical filter 40 does not need to be additionally fixed through adhesives or the like, so that the optical filter 40 is prevented from being dirtied in the fixing process. Moreover, in this embodiment, the optical filter 40 is sandwiched between the metal frame 32 and the plastic platform 31 through the insert molding process, and the optical filter 40 is embedded into the plastic platform 31, so that only a small width is needed to be supported on the plastic platform 31, which is helpful for reducing the size of the camera module in the horizontal direction.

Third Embodiment

Figure 13:
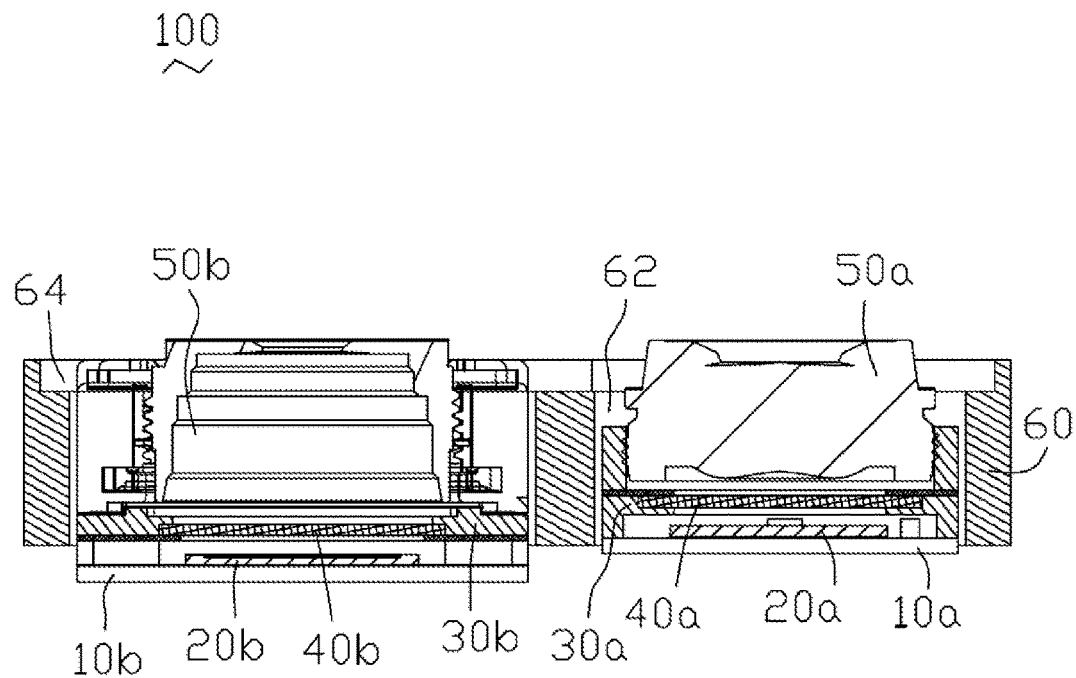
FIG. 13 is a schematic cross-sectional view of a camera module according to a third embodiment of the present invention.
Figure 14:
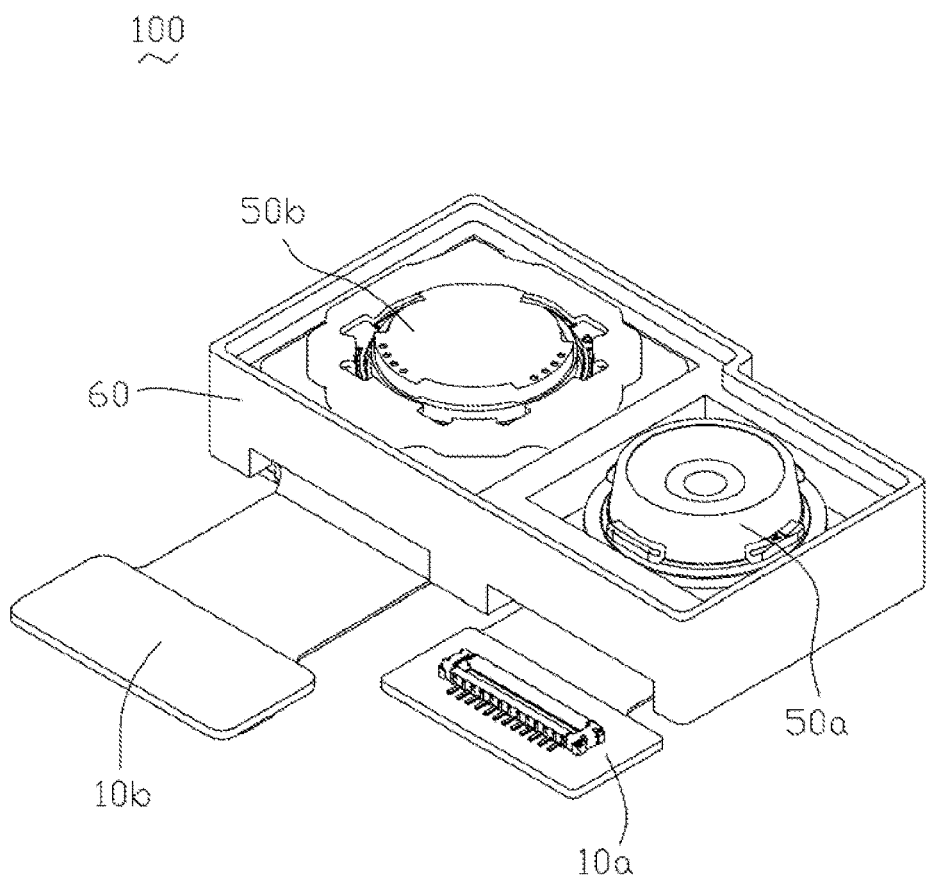
FIG. 14 is a perspective view of the camera module of FIG. 13.

As shown in FIGS. 13-14, a camera module 100 of this embodiment is a dual camera module including a first circuit board 10a, a first photosensitive chip 20a, a first support base 30a, a first optical filter 40a, a first lens assembly 50a, a second circuit board 10b, a second photosensitive chip 20b, a second support base 30b, a second optical filter 40b, a second lens assembly 50b, and a seat 60. The first photosensitive chip 20a and the second photosensitive chip 20b are respectively arranged on the first circuit board 10a and the second circuit board 10b, and the first photosensitive chip 20a and the second photosensitive chip 20b are respectively positioned within the first support base 30a and the second support base 30b. The first support base 30a and the second support base 30b are respectively fixed on the first circuit board 10a and the second circuit board 10b. The first optical filter 40a and the first lens assembly 50a are installed on the first support base 30a, and the first optical filter 40a is positioned between the first photosensitive chip 20a and the first lens assembly 50a. The second optical filter 40b and the second lens assembly 50b are installed on the second support base 30b, and the second optical filter 40b is positioned between the second photosensitive chip 20b and the second lens assembly 50b.

In this embodiment, the first circuit board 10a, the first photosensitive chip 20a, the first support base 30a, the first optical filter 40a and the first lens assembly 50a have the same structure as the circuit board 10, the photosensitive chip 20, the support base 30, the optical filter 40 and the lens assembly 50 in the first embodiment; the second circuit board 10b, the second photosensitive chip 20b, the second support base 30b, the second optical filter 40b and the second lens assembly 50b have the same structure as the circuit board 10, the photosensitive chip 20, the support base 30, the optical filter 40 and the lens assembly 50 in the second embodiment, with the details not repeated herein. That is to say, the dual camera module includes a zoom camera and a fixed-focus camera. It can be understood that the dual camera module may also include two zoom cameras, or two fixed-focus cameras, with no limitation on the type of camera.

In this embodiment, the seat 60 is provided with a first mounting hole 62 and a second mounting hole 64. The first circuit board 10a, the first photosensitive chip 20a, the first support base 30a, the first optical filter 40a and the first lens assembly 50a are assembled together and then mounted in the first mounting hole 62. The second circuit board 10b, the second photosensitive chip 20b, the second support base 30b, the second optical filter 40b and the second lens assembly 50b are assembled together and then mounted in the second mounting hole 64.

Fourth Embodiment

Figure 15:
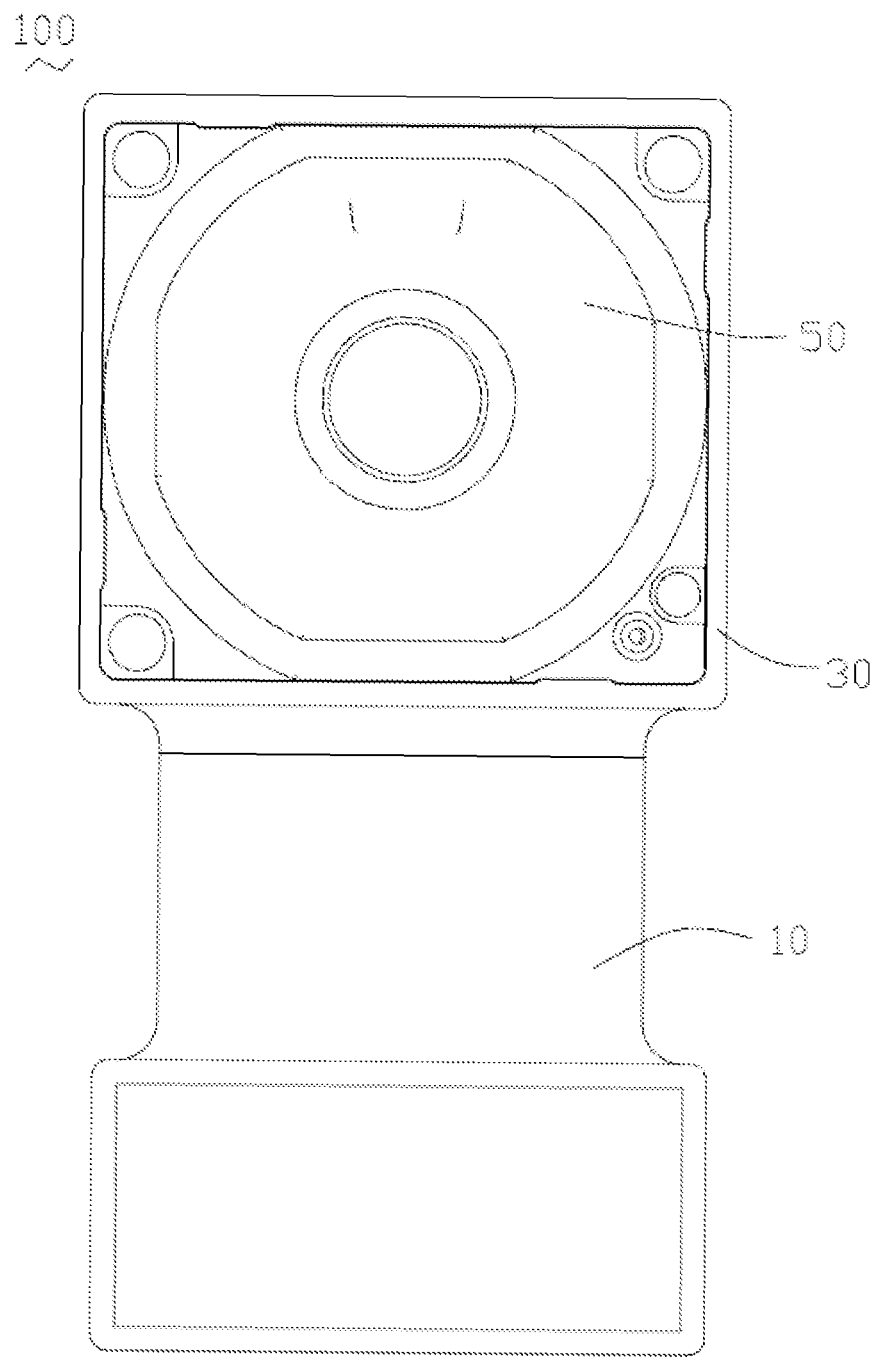
FIG. 15 is a schematic front view of a camera module according to a fourth embodiment of the present invention.
Figure 16:
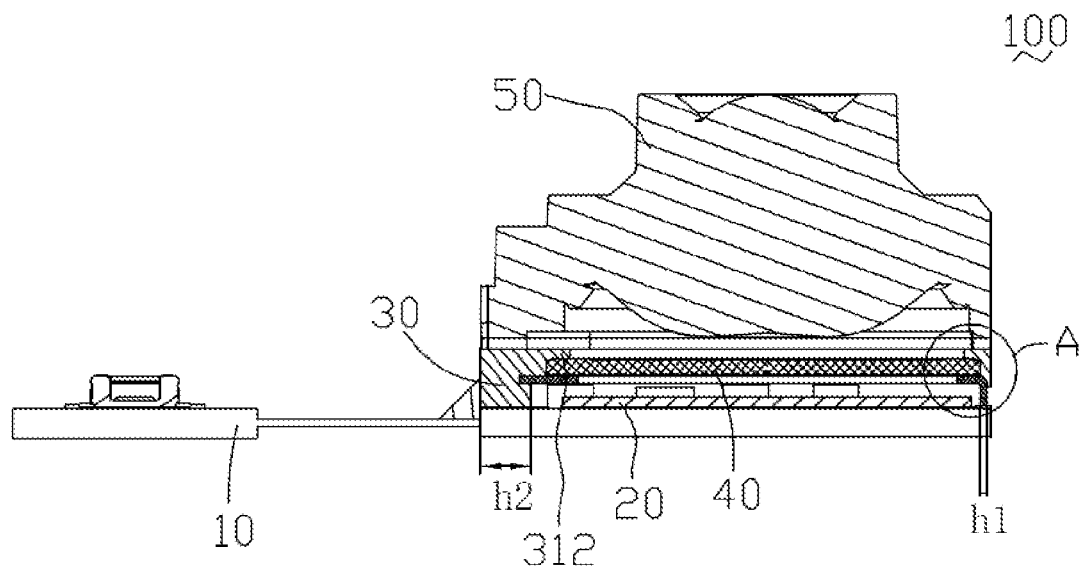
FIG. 16 is a schematic cross-sectional view of the camera module of FIG. 15.
Figure 17:
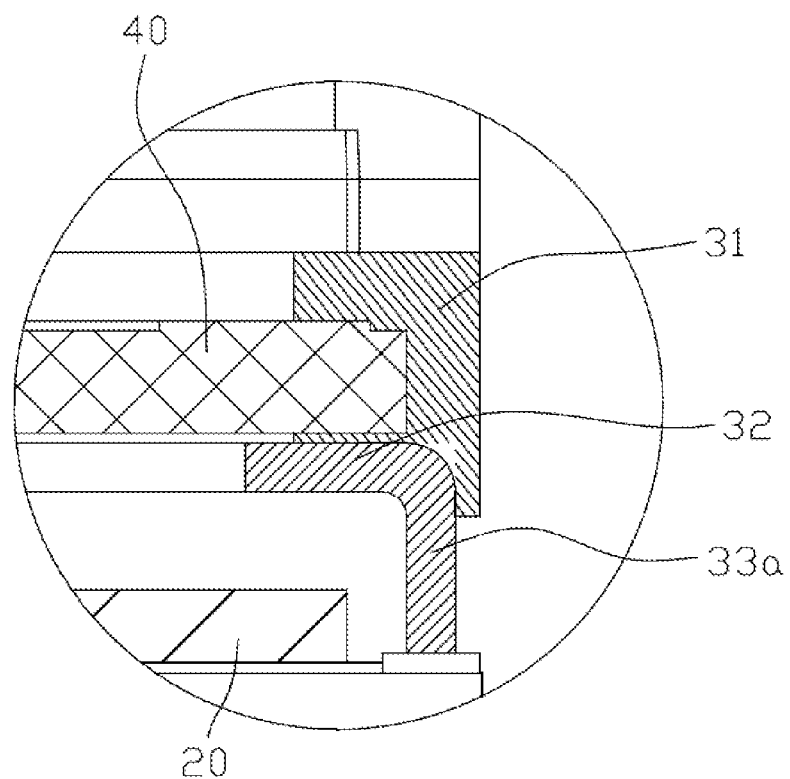
FIG. 17 is a partially enlarged view of the portion A of FIG. 16.

As shown in FIGS. 15-17, in this embodiment, a camera module 100 includes a circuit board 10, a photosensitive chip 20, a support base 30, an optical filter 40, and a lens assembly 50. The photosensitive chip 20 is arranged on the circuit board 10 and is positioned within the support base 30. The support base 30 is fixed on the circuit board 10. The optical filter 40 and the lens assembly 50 are installed on the support base 30, and the optical filter 40 is positioned between the photosensitive chip 20 and the lens assembly 50.

The support base 30 includes a plastic platform 31 and a metal frame 32. The metal frame 32 is fixed on the plastic platform 31. The optical filter 40 is sandwiched between the plastic platform 31 and the metal frame 32. The plastic platform 31, the metal frame 32 and the optical filter 40 can be bonded together through insert molding. That is, when forming the plastic platform 31, the metal frame 32 and the optical filter 40 are placed in a mold, then molten plastic material is injected into the cavity of the mold to cover the periphery of the metal frame 32 and the optical filter 40 with the molten plastic material and form the plastic platform 31 after cooling, so that the metal frame 32 and the optical filter 40 are embedded in the plastic platform 31. However, the manner in which the metal frame 32 and the optical filter 40 are bonded to the plastic platform 31 is not limited, for example, the metal frame 32 can be bonded to the plastic platform 31 through adhesives, locking, screws or interference fit, while the optical filter 40 is sandwiched between the plastic platform 31 and the metal frame 32.

Figure 18:
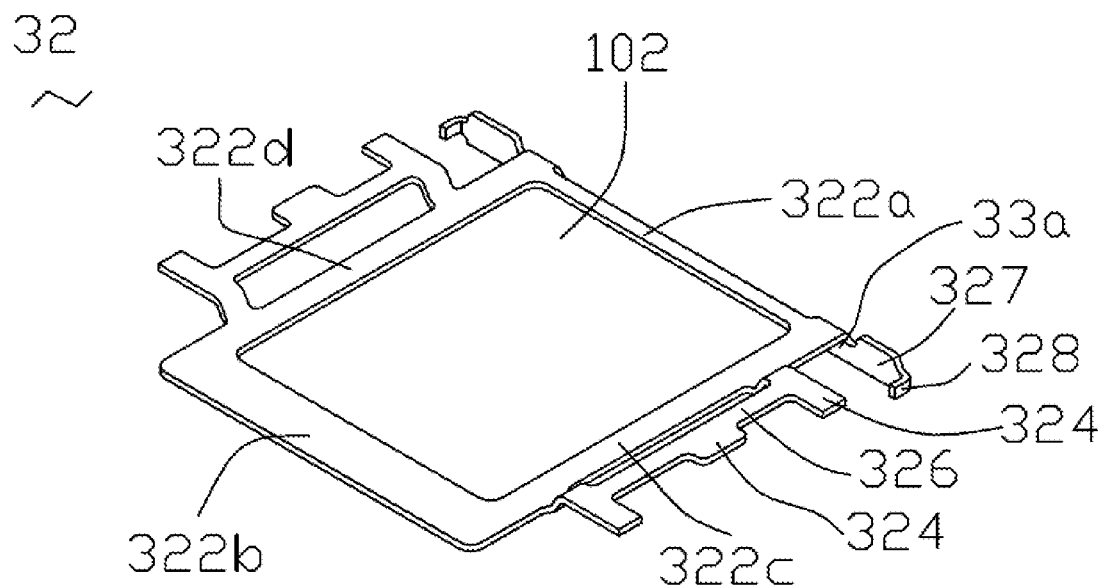
FIG. 18 is a schematic view of a metal frame of the camera module of FIG. 15.
Figure 19:
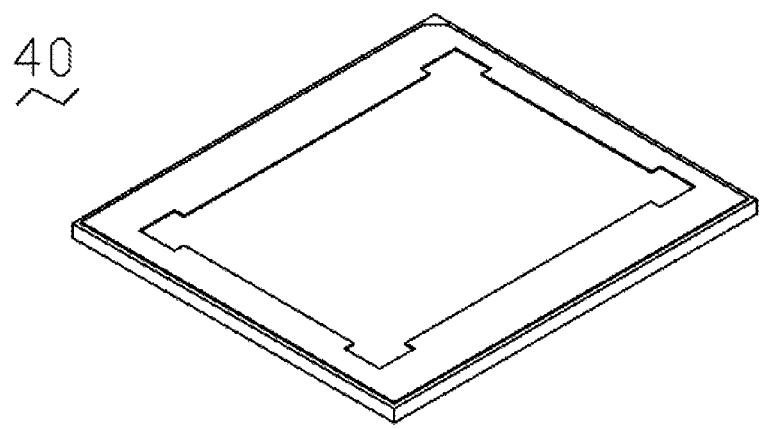
FIG. 19 is a schematic view of an optical filter of the camera module of FIG. 15.
Figure 20:
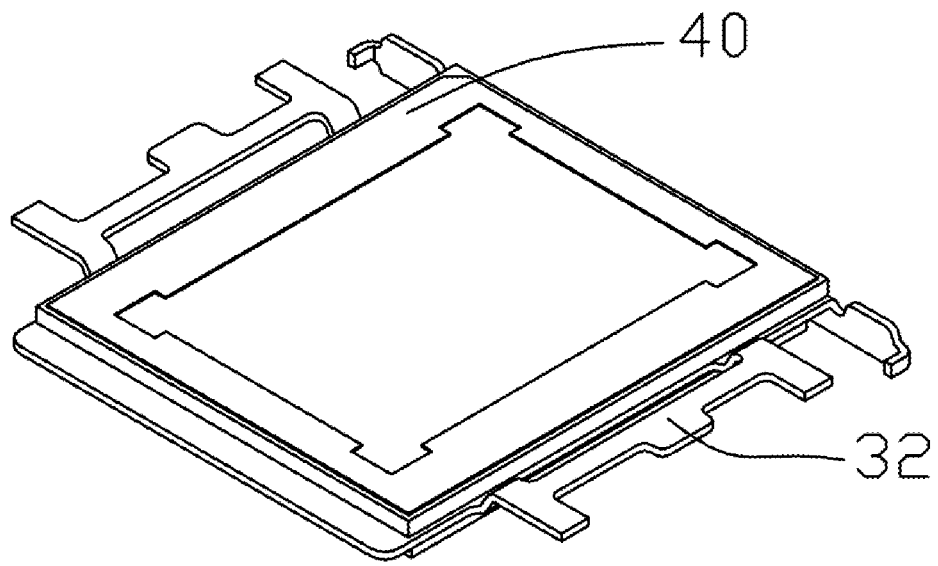
FIG. 20 is a schematic view showing that the optical filter of the camera module of FIG. 15 is attached to the metal frame.
Figure 21:
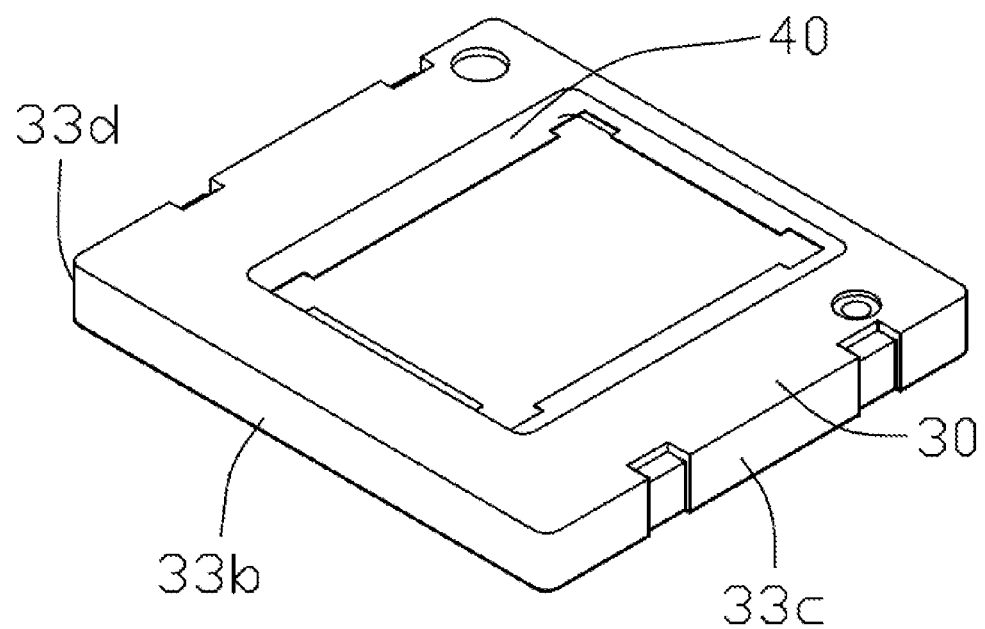
FIG. 21 is a schematic view showing that the optical filter of the camera module of FIG. 15 is bonded to the support base.

Specifically, when the plastic platform 31, the metal frame 32, and the optical filter 40 are bonded together by an insert molding process, as shown in FIGS. 18-19, the metal frame 32 and the optical filter 40 are first provided; as shown in FIG. 20, the optical filter 40 is then attached to one side of the metal frame 32, e.g., the optical filter 40 is attached to the upper side of the metal frame 32; as shown in FIG. 21, the plastic platform 31 is then injection molded by an insert molding process to bond the plastic platform 31, the metal frame 32 and the optical filter 40 together, and the optical filter 40 is sandwiched between the metal frame 32 and the plastic platform 31. Because the optical filter 40 is sandwiched and fixed between the metal frame 32 and the plastic platform 31 through insert molding process, and the optical filter 40 is embedded into the plastic platform 31, a smaller width is needed to be supported on the plastic platform 31, which is helpful for reducing the size of the camera module in the horizontal direction.

The middle of the plastic platform 31 is provided with a first through hole 101 for light to pass through, and the first through hole 101 penetrates through the plastic platform 31. The optical filter 40 is disposed in the first through hole 101 of the plastic platform 31, and the photosensitive chip 20 is arranged corresponding to the first through hole 101.

In this embodiment, the inner sidewall of the plastic platform 31 is provided with fixing plates 312 for supporting the optical filter 40, and the outer periphery of the optical filter 40 is sandwiched between the fixing plates 312 and the metal frame 32. In this embodiment, the plastic platform 31 is disposed above the optical filter 40 and the metal frame 32 is disposed below the optical filter 40. It can be understood that the plastic platform 31 may also be disposed below the optical filter 40 and the metal frame 32 may be disposed above the optical filter 40.

In this embodiment, the lens assembly 50 may be directly installed to the upper surface of the plastic platform 31 by adhesives or the like, so that there is no need to provide internal threads on the plastic platform 31 that engage with the external threads of the lens assembly 50. In this embodiment, the camera module is a fixed-focus camera.

As shown in FIG. 18, the metal frame 32 includes a first flat plate 322a, a second flat plate 322b, a third flat plate 322c, and a fourth flat plate 322d. The first flat plate 322a and the second flat plate 322b are oppositely arranged, the third flat plate 322c and the third flat plate 322d are oppositely arranged and connected between the first flat plate 322a and the second flat plate 322b. The first flat plate 322a, the second flat plate 322b, the third flat plate 322c and the fourth flat plate 322d are connected to surround and form a second through hole 102 corresponding to the first through hole 101. A portion of each flat plate 322a, 322b, 322c, 322d is exposed outside the plastic platform 31, and the other portion of each flat plate 322a, 322b, 322c, 322d is embedded in the plastic platform 31 through the insert molding process, so that the metal frame 32 and the plastic platform 31 are bonded together. It can be understood that each flat plate 322a, 322b, 322c, 322d may also be wholly embedded in the plastic platform 31, to thereby provide a greater bonding strength between the plastic platform 31 and the metal frame 32. In one embodiment, the metal frame 32 is formed of aluminum or iron by cutting or stamping, while the particular material of the metal frame 32 can be freely selected as desired.

Specifically, at least one flat plate 322 is provided with a plurality of wings 324 and connecting plates 326. In this embodiment, the connecting plate 326 is connected to the third flat plate 322c and the fourth flat plate 322d through at least two wings 324, there are gaps provided between the connecting plate 326 and the third and fourth flat plates 322c, 322d, and the wings 324 are spaced apart from each other. The wings 324 are embedded into the plastic platform 31 during the insert molding process, so that the bonding strength of the metal frame 32 and the plastic platform 31 can be increased due to the presence of the wings 324. Because there are gaps between the connecting plate 326 and the third flat plate 322c and between the connecting plate 326 and the fourth flat plate 322d, the plastic platform 31 can be filled in the gaps during the insert molding process, to further increase the bonding strength between the metal frame 32 and the plastic platform 31. In one embodiment, the optical filter 40 is installed on the first flat plate 322a, the second flat plate 322b, the third flat plate 322c and the fourth flat plate 322d and covers the second through hole 102.

A plurality of support plates 33 are provided below the plastic platform 31. The support plates 33 are connected with the plastic platform 31 and disposed at the peripheral edge position of the plastic platform 31. The support plates 33 are used for fixing the plastic platform 31 on the circuit board 10. Specifically, the number of the support plates 33 may be four, and the four support plates 33 are connected to surround and form a rectangle. In this embodiment, as shown in FIGS. 17 and 21, at least one of the support plates 33 is a metal plate, and the remaining support plates 33 are plastic plates, the metal plate is formed by extending integrally from the metal frame 32, the plastic plates are formed by extending integrally from the plastic platform 31, and the thickness of the metal plate is smaller than that of each plastic plate.

In this embodiment, the support plates 33 include a first support plate 33a, a second support plate 33b, a third support plate 33c, and a fourth support plate 33d. The first support plate 33a and the second support plate 33b are oppositely arranged. The third support plate 33c and the fourth support plate 33d are oppositely arranged. The third support plate 33c and the fourth support plate 33d are connected between the first support plate 33a and the second support plate 33b. The first support plate 33a, the second support plate 33b, the third support plate 33c and the fourth support plate 33d are connected end to end to form a rectangular frame structure.

In this embodiment, the first support plate 33a is a metal plate formed by extending integrally from the first flat plate 322a of the metal frame 32. Specifically, the first support plate 33a may be integrally formed by bending 90° from one side edge of the first flat plate 322a. The second support plate 33b, the third support plate 33c and the fourth support plate 33d are plastic plates, and the second support plate 33b, the third support plate 33c and the fourth support plate 33d are formed by extending integrally from the plastic platform 31. That is, the second support plate 33b, the third support plate 33c, the fourth support plate 33d and the plastic platform 31 are integrally formed by injection molding.

In this embodiment, two ends of the first metal support plate 33a are individually formed with an extension plate 327 facing outwards. The rear end of the extension plate 327 is formed with a hook portion 328 perpendicular to the extension plate 327. The extension plates 327 and the hook portions 328 are all embedded into the plastic platform 31 to further increase the bonding strength between the metal frame 32 and the plastic platform 31.

In this embodiment, the first support plate 33a is made of metal and has a high strength, so that the thickness h1 of the first support plate 33a can be designed to be less than the thickness h2 of the second support plate 33b, the third support plate 33c and the fourth support plate 33d. For example, the thickness h1 of the first support plate 33a is 0.09 mm to 0.15 mm, while the thicknesses h2 of the second support plate 33b, the third support plate 33c and the fourth support plate 33d is 0.3 mm, but it is not limited thereto. Because the thickness h1 of the first supporting plate 33a of the support base 30 is smaller, when the first supporting plate 33a is disposed towards the top frame of a mobile phone, the camera module 100 can be installed at a position of the mobile phone closer to the top frame, the size of the screen of the mobile phone occupied by the camera module 100 is reduced, the requirement on the screen ratio of the mobile phone is met, and the use experience of the mobile phone is improved.

It can be understood that in other embodiments, the first support plate 33a and the second support plate 33b are configured as metal plates formed by extending integrally from the first flat plate 322a and the second flat plate 322b of the metal frame 32, respectively, while the third support plate 33c and the fourth support plate 33d are plastic plates formed by extending integrally from the plastic platform 31. Alternatively, the first support plate 33a, the second support plate 33b and the third support plate 33c are configured as metal plates formed by extending integrally from the first flat plate 322a, the second flat plate 322b and the third flat plate 322c of the metal frame 32, respectively, while the fourth support plate 33d is a plastic plate formed by extending integrally from the plastic platform 31. Alternatively, the first support plate 33a, the second support plate 33b, the third support plate 33c and the fourth support plate 33d are configured as metal plates formed by extending integrally from the first flat plate 322a, the second flat plate 322b, the third flat plate 322c and the fourth flat plate 322d of the metal frame 32, respectively. By setting more support plates 33 as metal plates, the size of the camera module 100 can be further reduced.

In the camera module 100 of this embodiment, the support base 30 is formed by bonding the plastic platform 31 and the metal frame 32, and the optical filter 40 is sandwiched between the plastic platform 31 and the metal frame 32. On one hand, the metal frame 32 embedded in the plastic platform 31 can greatly increase the strength of the support base 30 to form a better support; on the other hand, since the optical filter 40 is sandwiched and fixed between the plastic platform 31 and the metal frame 32, the optical filter 40 does not need to be additionally fixed through adhesives or the like, so that the optical filter 40 is prevented from being dirtied in the fixing process. Moreover, in this embodiment, the optical filter 40 is sandwiched between the metal frame 32 and the plastic platform 31 through the insert molding process, and the optical filter 40 is embedded into the plastic platform 31, so that only a small width is needed to be supported on the plastic platform 31, which is helpful for reducing the size of the camera module in the horizontal direction.

In addition, the size of the camera module is further reduced by setting at least one support plate 33 as a metal plate with relatively small thickness but relatively high strength. When the camera module 100 is installed on a mobile terminal, the mounting position of the camera module 100 can be closer to the top frame of the mobile terminal 200, so that the size of the camera module 100 occupying the screen of the mobile terminal 200 is reduced, the screen ratio of the mobile terminal 200 is thus improved, and the use experience of the mobile terminal 200 is further improved.

Fifth Embodiment

Figure 22:
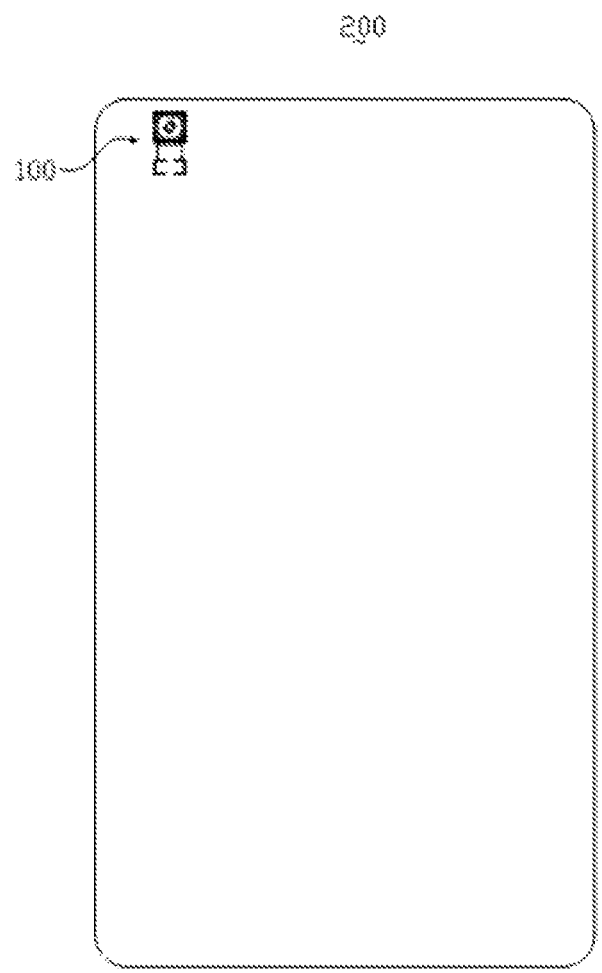
FIG. 22 is a schematic front view of a mobile terminal according to the present invention.

FIG. 22 is a front schematic view of a mobile terminal of the present invention. As shown in FIG. 22, the present invention also provides a mobile terminal 200. In this embodiment, the mobile terminal 200 takes a mobile phone as an example, but it is not limited thereto. For example, the mobile terminal 200 may also be a tablet computer or a notebook computer. The mobile terminal 200 includes a camera module 100 according to either of the above embodiments. The camera module 100 serves as a front camera of the mobile terminal 200 and is arranged at the top of the screen of the mobile terminal 200. In some embodiments, the camera module 100 may also serve as a rear camera of the mobile terminal 200.

In the camera module 100 of the mobile terminal of this embodiment, the support base 30 is formed by bonding the plastic platform 31 and the metal frame 32, and the optical filter 40 is sandwiched between the plastic platform 31 and the metal frame 32. On one hand, the metal frame 32 embedded in the plastic platform 31 can greatly increase the strength of the support base 30 to form a better support; on the other hand, since the optical filter 40 is sandwiched and fixed between the plastic platform 31 and the metal frame 32, the optical filter 40 does not need to be additionally fixed through adhesives or the like, so that the optical filter 40 is prevented from being dirtied in the fixing process. Moreover, in this embodiment, the optical filter 40 is sandwiched between the metal frame 32 and the plastic platform 31 through the insert molding process, and the optical filter 40 is embedded into the plastic platform 31, so that only a small width is needed to be supported on the plastic platform 31, which is helpful for reducing the size of the camera module in the horizontal direction.

The foregoing description is merely preferred embodiments of the present invention and not intended to limit the invention, but it is intended that any modifications, equivalents, modifications, etc., made within the spirit and principles of the invention should be included within the scope of the invention.

What is claimed is:

1. A camera module comprising a support base, an optical filter and a lens assembly, the lens assembly being installed on the support base, wherein the support base comprises a plastic platform and a metal frame, the metal frame is bonded with the plastic platform, and the optical filter is sandwiched between the plastic platform and the metal frame.

2. The camera module according to claim 1, wherein the plastic platform, the metal frame and the optical filter are bonded together through an insert molding process.

3. The camera module according to claim 1, wherein an inner sidewall of the plastic platform is provided with fixing plates, and an outer periphery of the optical filter is sandwiched between the fixing plates and the metal frame.

4. The camera module according to claim 1, wherein a plurality of support plates are provided below the plastic platform, and the support plates are disposed at a periphery of the plastic platform.

5. The camera module according to claim 4, wherein at least one of the support plates is a metal plate extending integrally from the metal frame, and the remaining support plates are plastic plates extending integrally from the plastic platform.

6. The camera module according to claim 5, wherein a thickness of the metal plate is smaller than that of the plastic plate.

7. The camera module according to claim 5, wherein the support plates comprise a first support plate, a second support plate, a third support plate and a fourth support plate, the first support plate and the second support plate are oppositely arranged, the third support plate and the fourth support plate are oppositely arranged, wherein the first support plate, the second support plate, the third support plate and the fourth support plate are connected end to end to form a frame structure.

8. The camera module according to claim 7, wherein the first support plate is a metal plate, two ends of the first support plate are individually formed with an extension plate facing outwards, a rear end of the extension plate is formed with a hook portion perpendicular to the extension plate, and the extension plates and the hook portions are all embedded into the plastic platform.

9. The camera module according to claim 1, wherein the metal frame comprises a plurality of flat plates, the flat plates are connected end to end, at least one flat plate is provided with a plurality of wings, and the wings are all embedded into the plastic platform.

10. The camera module according to claim 9, wherein the metal frame further comprises a connecting plate, the connecting plate is connected to the flat plate through at least two wings, and there is a gap provided between the connecting plate and the flat plate.

11. The camera module according to claim 4, further comprising a circuit board and a photosensitive chip, wherein the photosensitive chip is arranged on the circuit board, the plastic platform is fixed on the circuit board via the support plates, and the optical filter is positioned between the photosensitive chip and the lens assembly.

12. The camera module according to claim 1, wherein a carrying portion is provided above the plastic platform for carrying the lens assembly, the carrying portion is provided with an inner thread on an inner sidewall thereof, the lens assembly is provided with an outer thread on an outer sidewall thereof, and the lens assembly is installed on the carrying portion through the inner thread engaged with the outer thread.

13. The camera module according to claim 1, wherein the lens assembly comprises a lens and a voice coil motor, the lens is fixedly installed on a mounting seat of the voice coil motor, one end of a lower spring of the voice coil motor is connected to the mounting seat, the other end of the lower spring of the voice coil motor is connected to the plastic platform, and the lens is driven to move up and down by the voice coil motor.

14. The camera module according to claim 1, wherein the lens assembly is directly installed to an upper surface of the plastic platform.

15. A mobile terminal comprising a camera module, the camera module comprising a support base, an optical filter and a lens assembly, the lens assembly being installed on the support base, wherein the support base comprises a plastic platform and a metal frame, the metal frame is bonded with the plastic platform, and the optical filter is sandwiched between the plastic platform and the metal frame.

16. The mobile terminal according to claim 15, wherein the plastic platform, the metal frame and the optical filter are bonded together through an insert molding process.

17. The mobile terminal according to claim 15, wherein an inner sidewall of the plastic platform is provided with fixing plates, and an outer periphery of the optical filter is sandwiched between the fixing plates and the metal frame.

18. The mobile terminal according to claim 15, wherein a plurality of support plates are provided below the plastic platform, and the support plates are disposed at a periphery of the plastic platform.

19. The mobile terminal according to claim 18, wherein at least one of the support plates is a metal plate extending integrally from the metal frame, and the remaining support plates are plastic plates extending integrally from the plastic platform.

20. The mobile terminal according to claim 15, wherein the metal frame comprises a plurality of flat plates, the flat plates are connected end to end, at least one flat plate is provided with a plurality of wings, and the wings are all embedded into the plastic platform.

* * * * *